J. C. MACFARLANE & H. BURGE.
ELECTRICALLY OPERATED MOTOR VEHICLE.
APPLICATION FILED JUNE 6, 1912.

1,049,115.

Patented Dec. 31, 1912.

J. C. MACFARLANE & H. BURGE.
ELECTRICALLY OPERATED MOTOR VEHICLE.
APPLICATION FILED JUNE 6, 1912.

1,049,115.

Patented Dec. 31, 1912.

2 SHEETS—SHEET 2.

Inventors
James C. Macfarlane
Henry Burge

UNITED STATES PATENT OFFICE.

JAMES C. MACFARLANE AND HENRY BURGE, OF ARC WORKS, CHELMSFORD, ENGLAND, ASSIGNORS TO CROMPTON & COMPANY LIMITED, OF CHELMSFORD, ENGLAND.

ELECTRICALLY-OPERATED MOTOR-VEHICLE.

1,049,115. Specification of Letters Patent. Patented Dec. 31, 1912.

Application filed June 6, 1912. Serial No. 702,124.

*To all whom it may concern:*

Be it known that we, JAMES COLQUHOUN MACFARLANE and HENRY BURGE, subjects of the King of Great Britain, residing at Arc Works, Chelmsford, in the county of Essex, England, have invented certain new and useful Improvements in Electrically-Operated Motor-Vehicles, of which the following is a specification.

This invention relates to the method of propelling and controlling electrically operated motor vehicles and is especially applicable to electrically operated omnibuses.

In United States Letters Patent Nos. 980,979, dated January 10, 1911, and 998,364, dated July 18, 1911, we have described an electrical system suitable among other purposes for driving the road wheels of a motor vehicle, and the present invention will be described with reference to such a system although the invention applies also to other electrical systems of suitable nature.

In order that the invention may be clearly understood, we proceed to describe the same with reference to the accompanying drawings in which—

Figure 1:
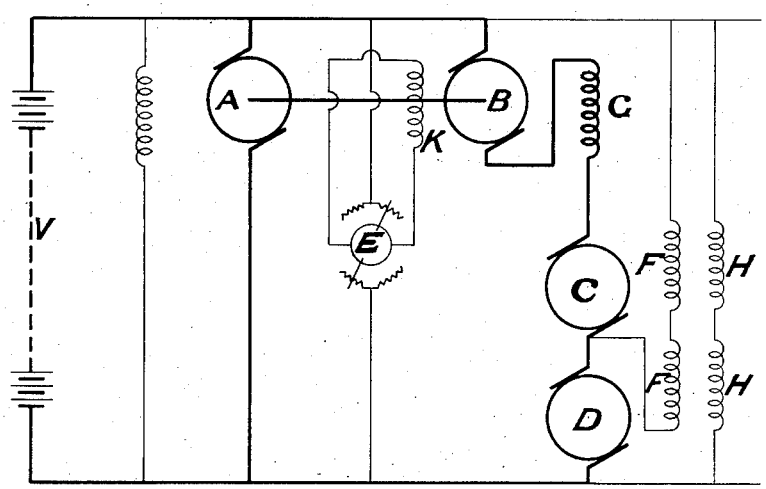
Figure 2:
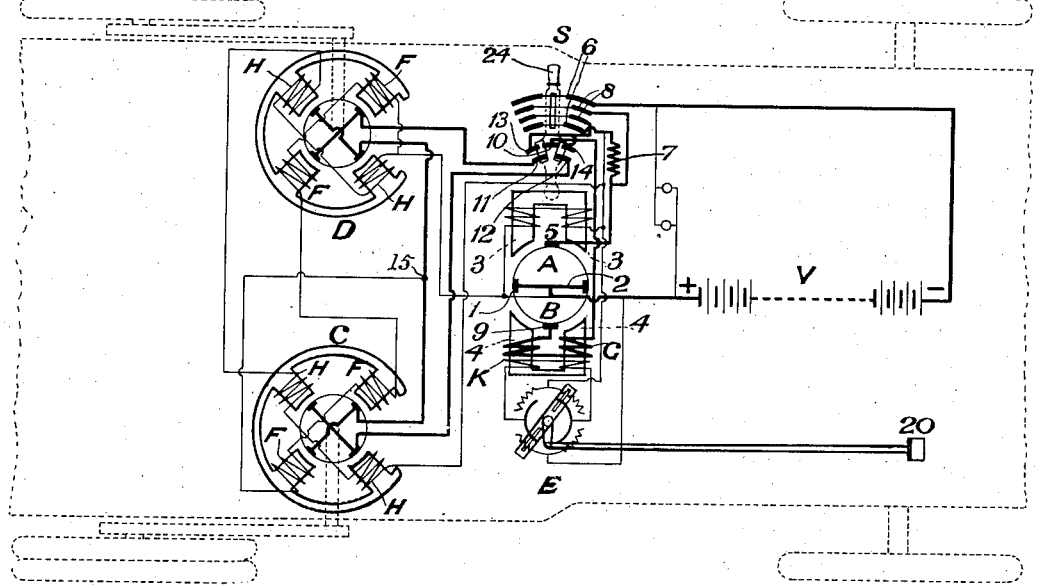
Figure 3:
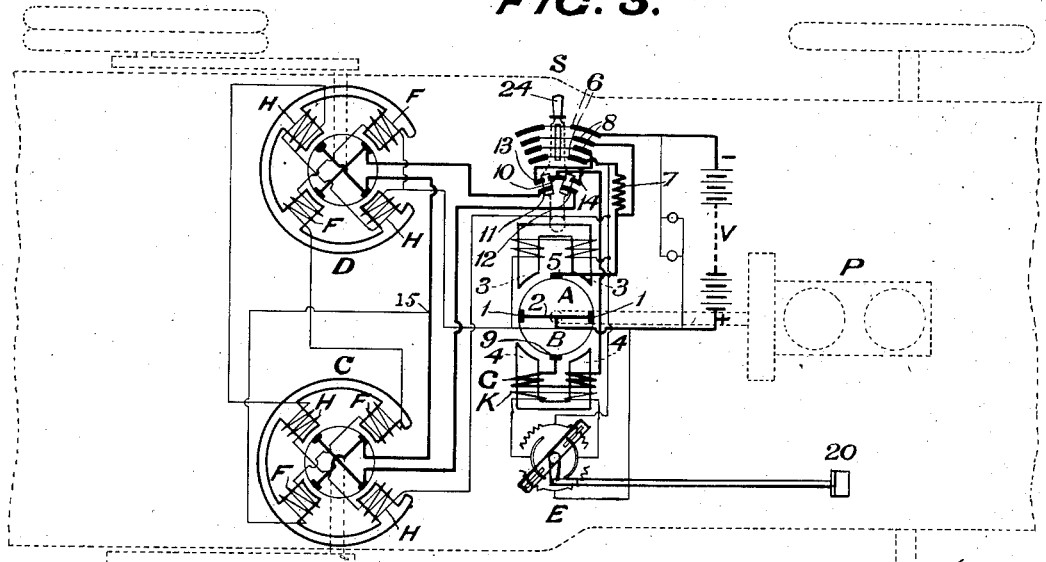

Figure 1 shows diagrammatically the electrical system described in the aforesaid United States Letters Patent. Fig. 2 represents the chassis of an electrically operated motor vehicle, whose motive power is derived from a storage battery, and which is provided with electrical equipment and control according to the present invention. Fig. 3 represents a chassis similar to that shown in Fig. 2, the motive power for which is obtained mainly from an petrol engine or other prime mover which is employed in conjunction with a small storage battery.

We prefer to employ for the propulsion of vehicles the electrical system described by us in the aforesaid United States Letters Patent in cases in which a separate motor is employed for each driving wheel, which construction also enables us to dispense with the differential, and we proceed to give an outline of the said system with reference to Fig. 1 of the drawings. In that figure A is the motor and B the generator of a motor generator, C and D are working motors, whose armatures are connected in series with B across the mains, to which energy is supplied by the battery V or its equivalent. The motor A is a separately excited machine whose armature is across the mains. The motors C and D are provided with two sets of field windings, one set H, H, being arranged across the mains and providing a constant excitation, and the other set F, F, being arranged in series with the armature of one of the motors D across the mains. The windings F, F, are arranged so as to assist the windings H, H.

The generator B is provided with a variable and reversible shunt excitation K, controlled by the regulator E. When the regulator E is over to the right (say) the generator B adds its voltage to that of the battery, but when the regulator is to the left, the generator voltage is subtracted from that of the battery. With the regulator in its mid-position the generator B is not excited. An additional winding G (called a safety winding) is also provided on the field of the generator B in series with the generator and the working motor which opposes the winding K when B is acting as a generator delivering power to C and D.

We may provide a petrol engine or other prime mover on the shaft of the motor generator to take up the mean load by which the battery can be greatly reduced in size and weight.

The advantages of this electrical system are as follows: During the period of negative acceleration when the motors are returning energy, the fields of the motors are strengthened so that the electrical braking tendency is largely increased, whereas when the motors are being accelerated and are rotating rapidly the field strength of the motors is diminished so that acceleration is facilitated. Moreover, by means of an auxiliary series winding on the generator, the load on the motors is always kept within safe limits when the motors are driving as well as when they are braking. To take a concrete example, assume the battery V gives 100 volts and that the generator B is a 100 volt machine. If B be fully positively excited with regulator E to the right, its voltage will be added to that of the line and there will be 200 volts across the motors C and D. Thus these motors will be capable of rotating at full speed. If, however, owing to an increase of load on the motors their speed should fall, the increased current flowing through the winding G will reduce the field of B and thus lower the volts on the motors C and D whereby any danger of burning out is avoided. Moreover at full speed the voltage across the windings F, F, will be practically nothing as the motor D is developing a counter E. M. F. of nearly 100 volts so that the field of the motors is due to the windings H, H, alone. When however the speed of the motors drops, the counter E. M. F. of D falls and therefore the windings F, F, come into operation thus strengthening the motor fields progressively as their speed falls.

When the regulator E is in its middle position the generator B is not excited and the voltage on the motors is that due to the battery V namely 100, and when the regulator is to the left, the generator is developing a counter E. M. F. of 100 volts and there will be no volts on the motors and they will come to rest. In every case, however, the field strength of the motors C and D increases as the speed falls and the field due to G increases with increased current through the motor armature. When current is being supplied to C and D from B, increase of such current causes the field G to reduce the voltage of supply, thus limiting the current flowing, and when the supply voltage is below the back E. M. F. of the motors C and D so that the motors are returning energy, the field G increases the voltage of supply so as to limit the amount of the current returned to the line by the motors C and D.

The present invention relates to methods and apparatus for applying the aforesaid electrical system, or one of a similar kind, to a motor driven vehicle in such a way that the differential in the back axle is dispensed with, the control is rendered very simple and effective, and the necessary braking can be done entirely electrically. In order to avoid the disadvantages of a differential the known use of separate motors to each driving wheel is adopted.

Referring to Fig. 2 of the drawings, C and D are the working motors, each motor being geared by a chain drive or in other suitable way to one of the driving wheels. A motor generator of the type in which a single armature divided into a motor and generator portion by short circuited brushes and rotating in a divided field is shown to the right of said working motors, the upper portion of the armature A represents the motor half of the armature the lower half B represents the generator portion of the armature.

1, 1, are brushes connected by the conductor 2 which divide the armature electrically into the said motor and generator portions. The motor portion of the armature rotates in the field 3, 3, and the generator portion rotates in the field 4, 4. Current is led into the motor portion of the armature A from the battery V between the short circuited brushes 1, 1, and the brush 5. The circuit is completed through the starting switch shown diagrammatically at S to the other pole of the battery. The upper portion of the said switch S which is shown in the neutral position starts up the motor generator when moved over either to the right or left, contact being first made through the contact 6, 6, so that the starting resistance 7 is included in the circuit, but further motion of the lever to the right or left bridges over the contact 8, 8, and thus cuts out the resistance. The lower part of the switch S is a reversing switch in the main circuit of the working motors whose function will be explained later.

The current supplied to the working motors C and D is obtained from the battery, and the generator half of the motor generator, which are arranged in series with the two motors, the circuit being as follows:— The current may be regarded as starting from the positive pole of the battery marked + and then enters the generator portion of the armature B by the brushes 1, 1, and leaves it by the brush 9, it then traverses the series winding G on the generator field 4 and passes to the central contact 10 of the lower or reversing portion of the switch S from whence it is led to the working motors arranged in series through one or other of the contacts 11, 12, according to the position of the switch S, returning through the corresponding contact 13 or 14, to the contact 8, thence through the blade of the switch to the contact 6, and so back to the other or negative terminal of the battery V. It will thus be seen that the battery, the generator, and the working motors are all in series.

The excitation of the generator field 4, 4, is derived from the battery through the intervention of a variable reversible shunt regulator marked E, the constant excitation of the motor field 3, 3, is obtained directly from the battery. By means of the regulator E, the generator can be caused to give any voltage from zero up to the voltage of the battery in either direction, that is, it can either assist or oppose the battery so that the voltage on the working motors C and D can be boosted down to nothing or up to twice the voltage of the battery.

The working motors are provided with two sets of fields, namely, constant excitation windings H taken off the battery and variable excitation windings F connected between the positive side of the battery and a point 15 in the main conductor connecting the two working motors C and D. The effect of these windings has already been described with reference to Fig. 1 of the drawings.

We provide for controlling the vehicle a foot pedal 20 which operates the variable reversible shunt regulator E, the connection between the pedal 20 and the regulator E is so designed that when the pedal is in its upper position, the excitation of the generator is such that its voltage is opposed to that of the battery so that if the vehicle is moving at any speed and the pedal is allowed to suddenly come into its upper position, a strong braking effect will be experienced and energy will be returned to the battery. Moreover such braking effect will continue till the vehicle comes actually to rest. In order to provide a braking effect when the vehicle is at rest, we arrange that when the pedal is in its normal elevated position, the generator B gives a back voltage slightly in excess of the voltage of the battery, so that a small reverse current flows through the motor which produces a backward torque on the driving wheels sufficient to prevent the vehicle from moving forward on a moderate incline, but yet not sufficient to start the vehicle backward on the level.

Only two controlling members are necessary for the complete control of a vehicle made in accordance with the present invention, namely, a foot pedal 20 which determines by its position the speed of the vehicle and the amount of forward acceleration or of braking that is to be communicated thereto; and a single lever 24 controlling the switch S which operates to start up the motor generator and to determine, according to its position, whether the vehicle shall travel backward or forward.

The lever 24 of the switch S is so arranged that the operation of starting up the motor generator takes place before the current is switched on to the working motors. By so inter-connecting the operations of starting up the motor generator, and reversing the direction of current through the motors, so that both functions are performed by one lever, the motor generator cannot be started up under load, and therefore it is impossible to burn out or overload any of the machines.

We may as shown in Fig. 3 of the accompanying drawings arrange a petrol engine or other prime mover P to drive the shaft of the motor generator. In this case the electrical connections are unaltered but the battery can be greatly reduced in size owing to the fact that the mean load is always taken by the petrol engine. All the electrical advantages of the system are nevertheless retained and the petrol engine can be started up in the same way that the motor generator was started, by means of the lever 24, the battery acting to start up the motor generator and therefore the petrol engine. In order however that the electrical system may not be disturbed the engine or prime mover must be of a type which slows down in speed as it is loaded, that is to say, the engine must have a drooping speed torque characteristic. If this condition is properly fulfilled the machine A will still be able to act as a motor or as a generator as required and will be capable of returning energy to the battery.

We have described this invention with reference to a motor generator of the now well known type having a single divided armature rotating in a divided field but we in no way limit ourselves to such form of machine and may employ a separate motor and generator mechanically coupled together and provided with the windings above described.

What we claim is—

1. In a system for the propulsion of the driving wheels of a self-propelled vehicle, an electric motor operably connected with each of said driving wheels, a battery and a motor generator for supplying energy to each of said electric motors, a variable reversible shunt regulator connected to said motor generator, a starting and reversing switch, a single foot pedal connected operatively with said variable reversible shunt regulator, and means for braking said vehicle electrically.

2. In a system for the propulsion of the driving wheels of a self-propelled vehicle, an electric motor operably connected with each of said driving wheels, a battery and a motor generator for supplying energy to each of said electric motors, each of said electric motors being arranged in series with the armature of said motor generator across the battery, a variable reversible shunt regulator connected to said motor generator, a starting and reversing switch, a single foot pedal connected operatively with said variable reversible shunt regulator, and means for braking said vehicle electrically.

3. In a system for the propulsion of the driving wheels of a self-propelled vehicle, an electric motor operably connected with each of said driving wheels, a battery, a motor generator having a motor element and a generator element, each of said electric motors being arranged in series with said battery and with said generator element, a variable reversible shunt regulator connected with said battery for controlling the field of said generator element, a starting and reversing switch, a single foot pedal connected directly therewith so as to operate said variable reversible shunt regulator, and windings upon said generator and driving motors respectively for the acceleration and electrical braking of said vehicle.

4. In a system for the propulsion of the driving wheels of a self-propelled vehicle, an electric motor operably connected with each of said driving wheels, a battery, a motor generator having a motor element and a generator element, each of said electric motors being arranged in series with said battery and with said generator element, a variable reversible shunt regulator connected with said battery for controlling the field of said generator element, a starting and reversing switch arranged when in its neutral position to cut off the supply of energy to said motor element and when in either its forward or backward positions to close the circuit to start up said motor generator, a single foot pedal connected directly therewith so as to operate positively said variable reversible shunt regulator, a series field winding upon said generator element for limiting the current drawn from the source of supply, and auxiliary shunt windings on said driving motors connected across the generator and one motor, for the acceleration and electrical braking of said vehicle.

5. In a system for the propulsion of the driving wheels of a self-propelled vehicle, an electric motor operably connected with each of said driving wheels, a battery, a motor generator having a motor element and a generator element, each of said electric motors being arranged in series with said battery and with said generator element, a variable reversible shunt regulator connected with said battery and with said generator element for the excitation of the field of said generator element in such a way that when the vehicle is at a standstill a small reverse current flows through said driving motors tending to produce a small backward torque on said driving wheels, a starting and reversing switch arranged when in its neutral position to cut off the supply of energy to said motor element and when in either its forward or backward positions to close the circuit to start up said motor generator, a single foot pedal connected directly therewith so as to operate positively said variable reversible shunt regulator, a series field winding upon said generator element for limiting the current drawn from the source of supply, and auxiliary shunt windings on said driving motors connected across the generator and one motor, for the acceleration and electrical braking of said vehicle.

6. In a system for the propulsion of the driving wheels of a self-propelled vehicle, an electric motor operably connected with each of said driving wheels, a battery, a motor generator having a motor element and a generator element, a prime mover coupled directly to said motor generator, each of said electric motors being arranged in series with said battery and with said generator element, a variable reversible shunt regulator connected with said battery and with said generator element for the excitation of the field of said generator element in such a way that when the vehicle is at a standstill a small reverse current flows through said driving motors tending to produce a small backward torque on said driving wheels, a starting and reversing switch arranged when in its neutral position to cut off the supply of energy to said motor element and when in either its forward or backward positions to close the circuit to start up said motor generator, a single foot pedal connected directly therewith so as to operate positively said variable reversible shunt regulator, a series field winding upon said generator element for limiting the current drawn from the source of supply, and auxiliary shunt windings on said driving motors connected across the generator and one motor, for the acceleration and electrical braking of said vehicle.

7. In a system for the propulsion of the driving wheels of a self-propelled vehicle, an electric motor operably connected with each of said driving wheels, a battery, a motor-generator having a motor element and a generator element, an internal combustion engine coupled directly to said motor generator, each of said electric motors being arranged in series with said battery and with said generator element, a variable reversible shunt regulator connected with said battery and with said generator element for the excitation of the field of said generator element in such a way that when the vehicle is at a standstill a small reverse current flows through said driving motors tending to produce a small backward torque on said driving wheels, a starting and reversing switch arranged when in its neutral position to cut off the supply of energy to said motor element and when in either its forward or backward positions to close the circuit to start up said motor generator, a single foot pedal connected directly therewith so as to operate positively said variable reversible shunt regulator, a series field winding upon said generator element for limiting the current drawn from the source of supply, and auxiliary shunt windings on said driving motors connected across the generator and one motor, for the acceleration and electrical braking of said vehicle.

In testimony whereof we have hereunto set our hands in presence of two subscribing witnesses.

JAMES C. MACFARLANE.
HENRY BURGE.

Witnesses:
HARRY JOHN STOGDEN,
ERNEST JOHN HILL.